US008713232B2

(12) United States Patent
Satpathy et al.

(10) Patent No.: US 8,713,232 B2
(45) Date of Patent: Apr. 29, 2014

(54) APPARATUS AND METHOD FOR TRANSFERRING A DATA SIGNAL PROPAGATED ALONG A BIDIRECTIONAL COMMUNICATION PATH WITHIN A DATA PROCESSING APPARATUS

(75) Inventors: Sudhir Kumar Satpathy, Ann Arbor, MI (US); David Theodore Blaauw, Ann Arbor, MI (US); Dennis Michael Sylvester, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 256 days.

(21) Appl. No.: 13/368,385

(22) Filed: Feb. 8, 2012

(65) Prior Publication Data

US 2013/0205056 A1 Aug. 8, 2013

(51) Int. Cl.
*G06K 13/00* (2006.01)
*H03K 17/00* (2006.01)

(52) U.S. Cl.
USPC ............. 710/107; 327/142; 340/3.1; 340/3.5

(58) Field of Classification Search
USPC ............ 710/107; 327/142; 340/3.1, 3.5, 3.54, 340/425.1
See application file for complete search history.

(56) References Cited

U.S. PATENT DOCUMENTS

| 5,202,593 | A * | 4/1993 | Huang et al. ..................... 326/86 |
| 2004/0257110 | A1* | 12/2004 | Mitarashi ......................... 326/56 |
| 2008/0136493 | A1* | 6/2008 | Sumita ........................... 327/374 |
| 2009/0043926 | A1* | 2/2009 | Hwang et al. ................... 710/51 |

OTHER PUBLICATIONS

UK Search Report dated Aug. 15, 2013 in GB 1302038.3.
B. Stackhouse et al, "A 65 nm 2-Billion Transistor Quad-Core Itanium Processor" *IEEE Journal of Solid-State Circuits*, vol. 44, No. 1, Dec. 2008, pp. 18-31.
Park et al., "A 1.2 TB/s On-Chip Ring Interconnect for 45 nm 8-Core Enterprise Xeon Processor", *ISSCC 2010/Session 9/ Digital Circuits & Sensors*, 2010, 4 pages.
Kim et al., "A 4Gb/s/ch 356IJ/b 10mm Equalized On-Chip Interconnect with Nonlinear Charge-Injecting Transmit Filter and Transimpedance Receiver in 90nm CMOS", *ISSCC 2009/Session 3/MicroProcessor Technologies*, 2009, 4 pages.
Stackhouse et al., "A 65nm 2-Billion-Transistor Quad-Core Itanium Processor", *ISSCC 2008/Session 4/MicroProcessors*, 2008, 4 pages.
Swift et al., "A 2.1 Tb/s 32×32 Self-Arbitrating Manycore Interconnect Fabric", *2011 Symposium on VLSI Circuits Digest of Technical Papers*, 2011, pp. 138-139.

(Continued)

*Primary Examiner* — Glenn A Auve
(74) *Attorney, Agent, or Firm* — Nixon & Vanderhye P.C.

(57) ABSTRACT

An apparatus including a first circuit and a second circuit connected in parallel to the bidirectional communication path, and one of the first and second circuits being an active circuit monitoring a value of the data signal on the bidirectional communication path while the other of the first and second circuits being a passive circuit that is not monitoring the value of the data signal. The active circuit initially starts in a low gain state, but on detection of a transition by transition detection circuitry, it enters a high gain state where the switch circuitry disconnects the transition detection circuitry from the bidirectional communication path, and the drive circuitry is activated in order to drive the data signal on the bidirectional communication path to the opposite value. Once the data signal has been driven to the opposite value, the active circuit and the passive circuits switch states.

23 Claims, 14 Drawing Sheets

(56) References Cited

OTHER PUBLICATIONS

Seo et al., "High-Bandwidth and Low-Energy On-Chip Signaling with Adaptive Pre-Emphasis in 90nm CMOS", *ISSCC 2010/Session 9/Digital Circuits & Sensors*, 2010, 4 pages.

Ho et al., "High-Speed and Low-Energy Capacitively-Driven On-Chip Wires", *ISSCC 2007/Session 22/Digital Circuit Innovations*, 2007, 4 pages.

Mensink et al., "A 0.28pJ/b 2Gb/s/ch Transceiver in 90nm CMOS for 10mm On-Chip Interconnects", *ISSCC 2007/Session 22/Digital Circuit Innovations*, 2007, 4 pages.

\* cited by examiner

APPARATUS AND METHOD FOR TRANSFERRING A DATA SIGNAL PROPAGATED ALONG A BIDIRECTIONAL COMMUNICATION PATH WITHIN A DATA PROCESSING APPARATUS

BACKGROUND OF THE INVENTION

1. Field of the Invention

The present invention relates to an apparatus and method for transferring a data signal propagated along a bidirectional communication path within a data processing apparatus.

2. Description of the Prior Art

Bidirectional communication paths are often used in data processing systems. For example, such bidirectional communication paths may be used within interconnect structures that form an integral part of global communication networks in multiprocessor chips. Such bidirectional communication paths facilitate high bandwidth with low silicon overhead by eliminating the need for replicating unidirectional signal wires. Examples of interconnects using such bidirectional communication paths are described in the article by C. Park et al. entitled, "A 1.2 TB/s on-chip ring interconnect for 45 nm 8-core enterprise Xeon® processor," ISSCC, pp. 180-181, 2010, and the article by S. Satpathy et al., entitled "SWIFT: A 2.1 Tb/s 32×32 Self-Arbitrating Manycore Interconnect Fabric," SoVC, pp. 180-181, 2011.

Conventional bidirectional communication paths typically include a series of repeaters distributed along the communication path in order to amplify the data as it is propagated along the communication path. Typically the repeater structures are based on duplication of unidirectional repeaters, one of which is selectively activated for signal propagation. An example of such a conventional repeater structure is illustrated in FIG. 1. As shown in FIG. 1, a bidirectional communication path is provided between a first processor core 10 and a second processor core 12, that communication path being separated into a series of bidirectional communication path portions 15 by the inclusion of a plurality of repeater circuits along the bidirectional communication path. In this example, each repeater circuit comprises a pair of inverters 20, 25, one of which is activated at any point in time dependent on the contents of an associated flip-flop 30. In particular, each flip-flop is controlled by a clock signal, and on the rising edge of the clock signal samples the enable signal presented to its input, that enable signal identifying which one of the inverters 20, 25 should be activated. Accordingly, if the first processor core 10 is to send a data signal to the second processor core 12, the enable signals will be set in order to cause the inverters 25 to be activated. Conversely, if the second processor core 12 is to send a data signal to the first processor core 10, the enable signals will be set in order to cause the inverters 20 to be activated.

Whilst such repeater circuits can be formed as standard cells, and hence can be incorporated into a wide variety of different designs of interconnect, such an approach incurs logic and interconnect overhead in order to configure the repeaters, due to the need to provide enable signals to the associated flip-flops 30 in order to control the operation of the repeaters. This can significantly degrade performance and energy efficiency. Additionally, a synchronising signal in the form of a clock signal is needed to eliminate contention when reversing signal propagation direction.

Furthermore, as interconnect structures increase in complexity, the number of locations from which a bidirectional communication link can be driven is increasing, making the handling of the control signals required to configure the repeaters a significant design challenge. For example, the article by B. Stackhouse et al., entitled "A 65 nm 2-Billion Transistor Quad-Core Itanium Processor," JSSCC pp. 18-31, Vol. 44, No. 1, January 2009, describes a complex interconnect structure employing snoop-based signalling schemes, where information regarding the direction of a data transfer is not available until approximately the same time as the data needs to be transferred. Accordingly, the need to issue control signals to configure the repeaters having regards to the direction of the data transfer before the data transfer can take place significantly impacts performance in such complex interconnect structures.

Recently, there has been a significant amount of research into the development of repeater-less signalling techniques. Examples of articles describing such repeater-less signalling techniques are:

B. Kim et al., "A 4 Gb/s/ch 356 fJ/b 10 mm Equalized On-chip Interconnect with Nonlinear Charge-Injecting Transmit Filter and Transimpedance Receiver in 90 nm CMOS," ISSCC, pp. 66-67, 2009;

J. Seo et al., "High Bandwidth and Low Energy On-Chip Signaling with Adaptive Pre-Emphasis in 90 nm CMOS," ISSCC, pp. 182-183, 2010;

R. Ho et al., "High-Speed and Low-Energy Capacitively-Driven On-Chip Wires," ISSCC, pp. 412-413, 2007; and E. Mensink et al., "A 0.28 pJ/b 2 Gb/s/ch Transceiver in 90 nm CMOS for 10 mm On-chip interconnects," ISSCC, pp. 414-415, 2007.

These techniques generally involve the use of pulse generation circuitry at one end of the bidirectional communication path to generate a pulse, with pulse detection circuitry at the other end of the bidirectional communication path then being arranged to detect that pulse. However, whilst such techniques can achieve high-speed communication with low energy dissipation based on reduced voltage swing, the pulse generation and detection circuitry needs to be carefully custom-designed having regards to each specific interconnect situation, and involves precise device matching, additional voltage supplies, and wider wire thickness/pitch. Accordingly, such techniques cannot be easily used in synthesis-based design flows or reused in different interconnect situations in the same design.

Accordingly, it would be desirable to provide an improved technique for transferring a data signal propagated along a bidirectional communication path within a data processing apparatus, which can be used without re-design within a wide variety of implementations, but with improved performance and reduced energy consumption when compared with the traditional approach described earlier with reference to FIG. 1.

SUMMARY OF THE INVENTION

Viewed from a first aspect, the present invention provides an apparatus for transferring a data signal propagated along a bidirectional communication path within a data processing apparatus, comprising: a first circuit and a second circuit connected in parallel to the bidirectional communication path, at any point in time one of the first and second circuits being an active circuit monitoring a value of the data signal on the bidirectional communication path and the other of the first and second circuits being a passive circuit that is not monitoring the value of the data signal; each of the first circuit and the second circuit comprising: transition detection circuitry configured, when connected to the bidirectional communication path, to detect a transition in an initial value of the data signal on the bidirectional communication path; switch circuitry configured to selectively connect the transition detection circuitry to the bidirectional communication path; drive circuitry configured when active to be responsive to detection of the transition by the transition detection circuitry to drive the data signal on the bidirectional communication path to an opposite value to the initial value; and control circuitry configured to control the operation of the transition detection circuitry, switch circuitry and drive circuitry; the active circuit initially being in a low gain state where the switch circuitry connects the transition detection circuitry to the bidirectional communication path, and the drive circuitry is not active; the control circuitry of the active circuit being responsive to a signal from the transition detection circuitry indicating that said transition has been detected, to cause the active circuit to enter a high gain state where the switch circuitry disconnects the transition detection circuitry from the bidirectional communication path, and the drive circuitry is activated in order to drive the data signal on the bidirectional communication path to said opposite value; the control circuitry of the one of the first and second circuits which is currently the active circuit being configured, following the data signal being driven to said opposite value, to place that one of the first and second circuits in a passive state where it then becomes the passive circuit; and the control circuitry of the other one of the first and second circuits which is currently the passive circuit being configured, following the data signal being driven to said opposite value, to place that other one of the first and second circuits in said low gain state where it then becomes the active circuit.

In accordance with the present invention, first and second circuits are connected in parallel to the bidirectional communication path, these circuits being identically constructed, but at any point in time one of those circuits being an active circuit monitoring the value of the data signal, whilst the other circuit is a passive circuit that is not monitoring the value of the data signal. The active circuit initially starts in a low gain state where its transition detection circuitry is monitoring the value of the data signal in order to detect a transition in that signal, but the drive circuitry is at that time not active. However, on detection of a transition by the transition detection circuitry, the active circuit enters a high gain state where the switch circuitry disconnects the transition detection circuitry from the bidirectional communication path, and the drive circuitry is activated in order to drive the data signal on the bidirectional communication path to the opposite value. This provides a high performance and energy efficient mechanism for transferring the data signal.

Furthermore, once the data signal has been driven to the opposite value, the active circuit enters a passive state where it then becomes the passive circuit, whilst the previously passive circuit enters the low gain mode where it then becomes the active circuit monitoring the bidirectional communication path for the next transition in the data signal. As a result, the apparatus is self-configuring, thus avoiding the requirement for propagation of configuration signals as required by the prior art technique of FIG. 1. This hence provides further performance and energy consumption savings.

In addition to the performance and energy consumption benefits that arise from the use of the apparatus of the present invention, the design is not dependent on the implementation details of the bidirectional communication path, and accordingly the design can be instantiated as a standard cell for use in a wide variety of different applications.

The apparatus can be used for a variety of purposes within a bidirectional communication path. However, in one embodiment, the apparatus forms a repeater placed within the bidirectional communication path to amplify the data signal as that signal is propagated along the bidirectional communication path.

In one such embodiment, the control circuitry in each of the first and second circuits receives as control input signals said signal from the transition detection circuitry indicating that said transition has been detected, and a signal indicative of the value of the data signal on the bidirectional communication path at an input to the first and second circuits, and is configured to control the transition of the associated first and second circuit between said passive state, said low gain state and said high gain state in dependence on those control input signals. Accordingly, the apparatus is self-configuring, and requires no externally provided configuration signal. Further, no clock signal is required for the apparatus, since both the first and second circuits transition between the low gain, high gain and passive states in dependence solely on the value of the data signal on the bidirectional communication path and the signal from the transition detection circuitry indicating that a transition has been detected, and hence the apparatus is entirely self-timed.

Due to the self-timed nature of the apparatus, the apparatus can readily be used within a bidirectional communication path connecting two devices operating at different clock speeds.

In one embodiment, if the value of the data signal at said input to the first and second circuits is a first value, the control circuitry of the first circuit is configured to place that first circuit in said low gain state where the first circuit is the active circuit, and the control circuitry of the second circuit is configured to place that second circuit in said passive state where the second circuit is the passive circuit. Conversely, if the value of the data signal at said input is a second value, the control circuitry of the second circuit is configured to place that second circuit in said low gain state where the second circuit is the active circuit, and the control circuitry of the first circuit is configured to place that first circuit in said passive state where the first circuit is the passive circuit.

Furthermore, in one embodiment, when the transition detection circuitry of the active circuit detects said transition, the control circuitry of the active circuit is configured to cause that active circuit to change from the low gain state to the high gain state. However, the control circuitry of the passive circuit is configured to retain the passive circuit in the passive state until after the data signal has been driven to said opposite value by the operation of the active circuit in said high gain state.

The repeater can be configured in a variety of ways. In one embodiment, the repeater acts as an inverter (with its two inputs having opposite values), whilst in an alternative embodiment the repeater acts as a buffer (with its two inputs having the same value).

In an alternative embodiment, the apparatus forms a state retention element (for example a flip-flop) placed within the bidirectional communication path to latch the data signal propagated along the bidirectional communication path in dependence on a clock signal. In one particular embodiment, such a state retention element is provided at both ends of the bidirectional communication path.

When the apparatus is used as a state retention element, that apparatus may further comprise a configuration storage element configured to store a control value indicative of the value of the data signal on the bidirectional communication path at an input to the first and second circuits during a predetermined transition in the clock signal. The control circuitry in each of the first and second circuits may then be arranged to receive, as control input signals, said signal from the transition detection circuitry indicating that said transition has been detected, and said control value stored in said configuration storage element, and is configured to control the transition of the associated first and second circuit between said passive state, said low gain state and said high gain state in dependence on those control input signals.

In one particular embodiment, if the control value stored in said configuration storage element is a first value, the control circuitry of the first circuit is configured to place that first circuit in said low gain state where the first circuit is the active circuit, and the control circuitry of the second circuit is configured to place that second circuit in said passive state where the second circuit is the passive circuit. Conversely, if the control value stored in said configuration storage element is a second value, the control circuitry of the second circuit is configured to place that second circuit in said low gain state where the second circuit is the active circuit, and the control circuitry of the first circuit is configured to place that first circuit in said passive state where the first circuit is the passive circuit.

In one embodiment, when the transition detection circuitry of the active circuit detects said transition, the control circuitry of the active circuit is configured to cause that active circuit to change from the low gain state to the high gain state. However, the control circuitry of the passive circuit is configured to retain the passive circuit in the passive state until after the control value stored in said configuration storage element has been updated following the next predetermined transition in said clock signal.

There are a number of ways in which the configuration storage element can be triggered to update the stored control value. In one embodiment, the apparatus further comprises a pulse generator configured to generate an activation pulse on occurrence of said predetermined transition in said clock signal, the activation pulse causing the configuration storage element to update the stored control value to indicate the current value of the data signal on the bidirectional communication path at said input to the first and second circuits. The predetermined transition will vary dependent on implementation. However, in one embodiment, the predetermined transition in said clock signal is a falling edge of the clock signal.

The transition detection circuitry can take a variety of forms. However, in one embodiment the transition detection circuitry comprises a pair of transistors arranged in a thyristor configuration. This provides a particularly efficient implementation for the transition detection circuitry enabling a rapid detection of the transition.

To further improve the speed of detection, in one embodiment both transistors of said pair are constructed to have a lower threshold voltage than other transistors within said apparatus.

In one embodiment, the transition detection circuitry comprises a pair of sensing nodes connected via the switch circuitry to said bidirectional communication path, and skewed inverter circuitry which is connected to said pair of sensing nodes and configured to generate the signal indicating that said transition has been detected. By skewing the inverter circuitry appropriately, this further improves the speed of detection of the transition.

In one embodiment, the apparatus has first and second input connections to said bidirectional communication path, and further comprises reset circuitry responsive to a reset condition to reset the value of the data signal at said first and second input connections to a predetermined state. This ensures that the apparatus is placed in a valid starting state following a reset.

In one embodiment where the apparatus forms an inverter, the reset circuitry is responsive to the reset condition to reset the value of the data signal to a logic 1 value at one of said first and second input connections and to a logic 0 value at the other one of said first and second input connections.

Viewed from a second aspect, the present invention provides an interconnect structure for a data processing apparatus comprising: a bidirectional communication path configured to route a data signal between first and second processing blocks of the data processing apparatus; and a plurality of repeater circuits distributed along said bidirectional communication path in order to separate said bidirectional communication path into a series of bidirectional communication path portions, each repeater circuit comprising an apparatus in accordance with the first aspect of the present invention. It has been found that by using repeater circuits in accordance with the first aspect the present invention, not only are performance and energy consumption benefits achieved due to the operation of the repeater circuits when compared with the conventional repeater circuits discussed earlier with reference to FIG. 1, but in addition a larger separation between repeaters is possible, thereby providing further energy savings, along with area savings.

In one embodiment, the interconnect structure further comprises reset circuitry responsive to a reset condition to reset the value of the data signal on each bidirectional communication path portion to a predetermined state. In one particular embodiment, each repeater forms an inverter, and the reset circuitry is responsive to the reset condition to reset the value of the data signal to a logic 1 value on every alternate bidirectional communication path portion, and to a logic 0 value on every other bidirectional communication path portion.

Viewed from a third aspect, the present invention provides a method of operating an apparatus to transfer a data signal propagated along a bidirectional communication path within a data processing apparatus, the apparatus comprising a first circuit and a second circuit connected in parallel to the bidirectional communication path, at any point in time one of the first and second circuits being an active circuit monitoring a value of the data signal on the bidirectional communication path and the other of the first and second circuits being a passive circuit that is not monitoring the value of the data signal, each of the first circuit and the second circuit comprising: transition detection circuitry for detecting, when connected to the bidirectional communication path, a transition in an initial value of the data signal on the bidirectional communication path; switch circuitry for selectively connecting the transition detection circuitry to the bidirectional communication path; drive circuitry which when active is responsive to detection of the transition by the transition detection circuitry to drive the data signal on the bidirectional communication path to an opposite value to the initial value; and control circuitry for controlling the operation of the transition detection circuitry, switch circuitry and drive circuitry, the method comprising: initially placing the active circuit in a low gain state where the switch circuitry connects the transition detection circuitry to the bidirectional communication path, and the drive circuitry is not active; causing the control circuitry of the active circuit, in response to a signal from the transition detection circuitry indicating that said transition has been detected, to place the active circuit in a high gain state where the switch circuitry disconnects the transition detection circuitry from the bidirectional communication path, and the drive circuitry is activated in order to drive the data signal on the bidirectional communication path to said opposite value; following the data signal being driven to said opposite value, causing the control circuitry of the one of the first and second circuits which is currently the active circuit to place that one of the first and second circuits in a passive state where it then becomes the passive circuit; and following the data signal being driven to said opposite value, causing the control circuitry of the other one of the first and second circuits which is currently the passive circuit to place that other one of the first and second circuits in said low gain state where it then becomes the active circuit.

Viewed from a fourth aspect, the present invention provides an apparatus for transferring a data signal propagated along a bidirectional communication path within a data processing apparatus, comprising: first means and second means for connecting in parallel to the bidirectional communication path, at any point in time one of the first and second means being an active means for monitoring a value of the data signal on the bidirectional communication path and the other of the first and second means being a passive means for not monitoring the value of the data signal; each of the first means and the second means comprising: transition detection means for detecting, when connected to the bidirectional communication path, a transition in an initial value of the data signal on the bidirectional communication path; switch means for selectively connecting the transition detection means to the bidirectional communication path; drive means for driving, when active and in response to detection of the transition by the transition detection means, the data signal on the bidirectional communication path to an opposite value to the initial value; and control means for controlling the operation of the transition detection means, switch means and drive means; the active means initially being in a low gain state where the switch means connects the transition detection means to the bidirectional communication path, and the drive means is not active; the control means of the active means, responsive to a signal from the transition detection means indicating that said transition has been detected, for causing the active means to enter a high gain state where the switch means disconnects the transition detection means from the bidirectional communication path, and the drive means is activated in order to drive the data signal on the bidirectional communication path to said opposite value; the control means of the one of the first and second means which is currently the active means, following the data signal being driven to said opposite value, for placing that one of the first and second means in a passive state where it then becomes the passive means; and the control means of the other one of the first and second means which is currently the passive means, following the data signal being driven to said opposite value, for placing that other one of the first and second means in said low gain state where it then becomes the active means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
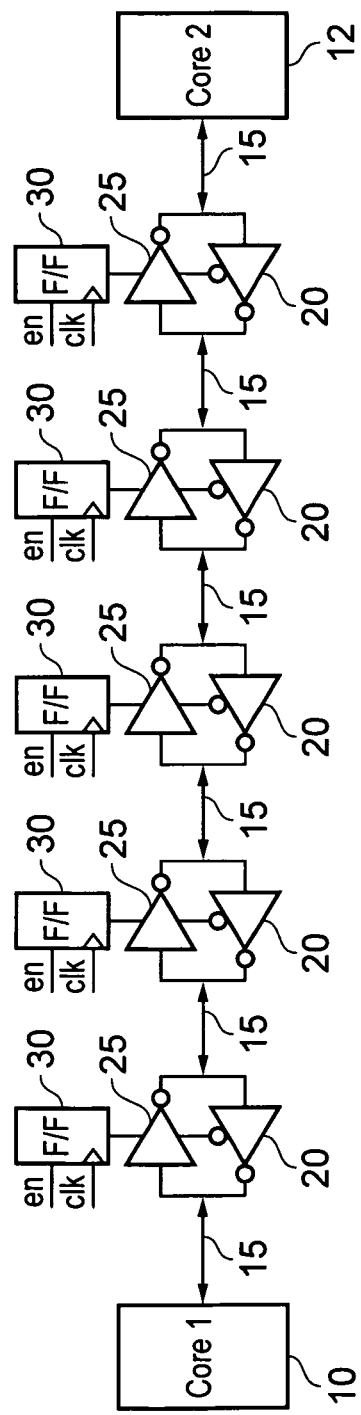
FIG. 1 is a diagram schematically illustrating a series of conventional repeaters distributed along a bidirectional communication path.
Figure 2:
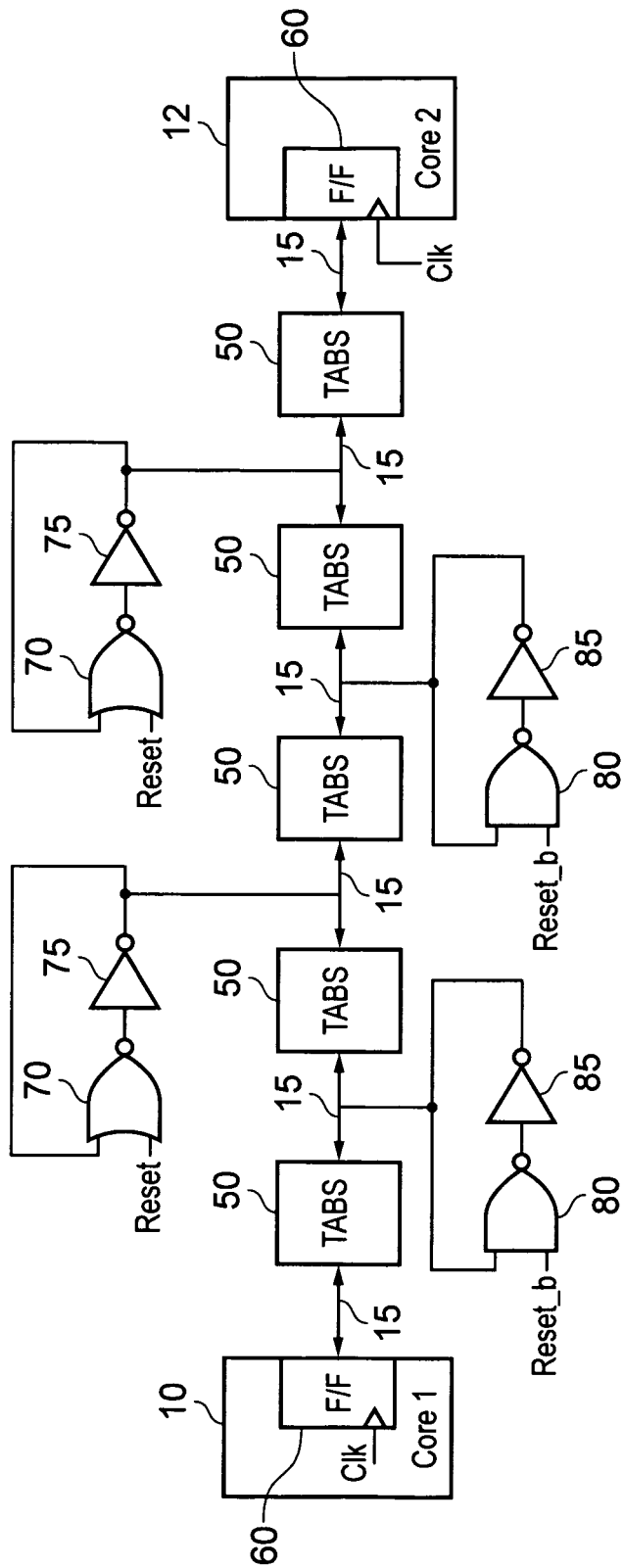
FIG. 2 is a diagram schematically illustrating a series of repeaters in accordance with one embodiment, distributed along a bidirectional communication path.

FIG. 2 is a diagram schematically illustrating a series of repeaters 50 in accordance with one embodiment, the series of repeaters being distributed along a bidirectional communication path in order to separate that path into a series of bidirectional path portions 15. As with the earlier example of FIG. 1, a first processor core 10 is connected to one end of the bidirectional communication path, and a second processor core 12 is connected to the other end of the bidirectional communication path. It will however be appreciated that there is no requirement for the devices connected to either end of the bidirectional communication path to be processor cores, and instead any suitable device may be connected to either end of the bidirectional communication path.

A detailed description of the construction of the repeaters 50 in accordance with one embodiment will be described later with reference to FIG. 5, but in one embodiment each repeater comprises first and second circuits connected in parallel across the bidirectional communication path, with each of the first and second circuits including a transition detection circuit in the form of a pair of transistors arranged in a CMOS "thyristor configuration", and accordingly in FIG. 2 each of the repeaters 50 is labelled as a "TABS" repeater, where TABS is an abbreviation for Thyristor-Assisted Bidirectional Signalling.

As will be discussed in more detail later with reference to FIG. 8, a circuit having the same basic operating characteristics as the repeaters 50 can be used to implement flip flops 60 provided along the bidirectional path, in the example of FIG. 2 such flip flops being used within each of the cores 10, 12. In the embodiment illustrated in FIG. 2, a data signal will traverse the entire bidirectional communication path from the flip flop 60 in one of the processor cores 10, 12 to the flip flop 60 in the other processor core 12, 10 in a single clock cycle.

As shown in FIG. 2, reset circuits are provided to be responsive to a reset condition to set an initial value of the data signal on each of the bidirectional communication path portions 15 spanning between two adjacent repeaters 50. In one embodiment, each repeater acts as an inverter, and accordingly on a reset signal the value of the data signal on opposing inputs to each repeater are set to opposite values. Accordingly, one type of reset circuit 70, 75 is arranged when the reset signal is asserted (in this example as a logic one value) to set the value on the associated communication path portion 15 to a logic one value. Conversely, another form of reset circuit 80, 85 is arranged when the reset signal is asserted to set the value of the data signal on the associated communication path portion to a logic zero value.

Figure 3A:
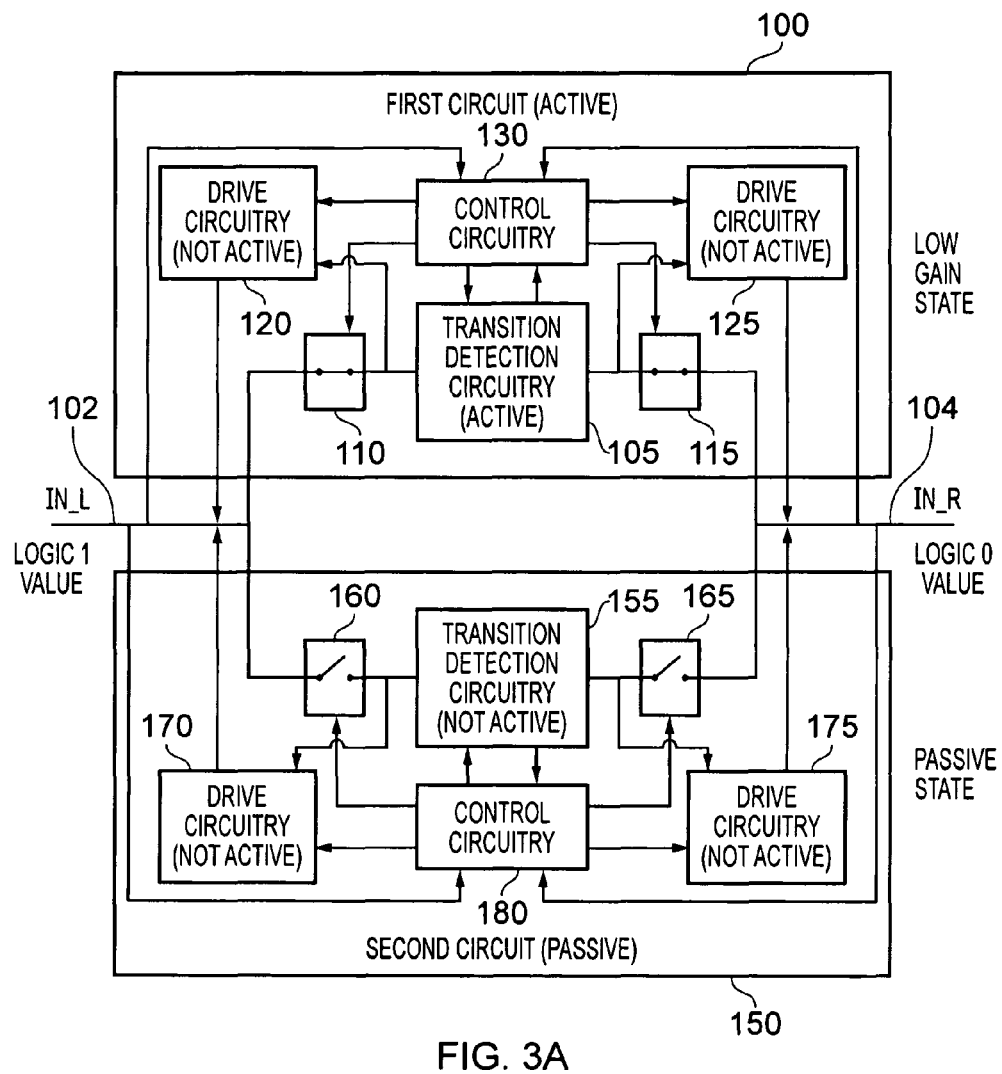
FIGS. 3A to 3C are block diagrams illustrating components provided within the first and second circuits of each repeater in accordance with one embodiment, and illustrating how the states of those circuits change during operation of the apparatus.

FIG. 3A illustrates a first circuit 100 and a second circuit 150 used to implement each repeater 50 in accordance with one embodiment. The first circuit comprises transition detection circuitry 105 which is configured, when connected to the bidirectional communication path, to detect a transition in an initial value of the data signal on the bidirectional communication path. Further, switch circuitry 110, 115 is provided which is configured to selectively connect the transition detection circuitry 105 to the bidirectional communication path. Drive circuits 120, 125 are configured when active to be responsive to detection of the transition by the transition detection circuitry 105 to drive the data signal on the bidirectional communication path to an opposite value to the initial value. Hence, if the initial value is a logic zero value, the value will then be driven to a logic one value, whereas if the initial value was a logic one value, then the value will be driven to a logic zero value. Finally, control circuitry 130 is provided to control the operation of the transition detection circuitry, switch circuitry and drive circuitry. The inputs that the control circuitry 130 receives in order to perform those control operations take two forms. Firstly, a signal is received from the transition detection circuitry 105 indicating when a transition in the initial value of the data signal has been detected. As a second control input, the control circuitry 130 receives the values from both input connections 102, 104 of the repeater.

The second circuit 150 is constructed in an identical manner, and accordingly the elements 155, 160, 165, 170, 175, 180 correspond to the elements 105, 110, 115, 120, 125 and 130 of the first circuit 100. However, the second circuit 150 is connected across the two inputs 102, 104 in a complementary manner to how the first circuit 100 is connected across the inputs 102, 104. As a result, the first and second circuits 100, 150 are used to detect transitions in the data value in opposing directions. Hence, by way of example, the first circuit 100 may be arranged to detect a logic one to logic zero transition at the input 102 or a logic zero to a logic one transition at the input 104. Conversely, the second circuit 150 may be configured to detect a transition from a logic zero value to a logic one value at the first input 102 and a logic one value to a logic zero value transition at the second input 104.

At any point in time, one of the first and second circuits will be an active circuit monitoring the value of the data signal on the bidirectional communication path, whilst the other circuit will be a passive circuit that is not monitoring the value of the data signal. For the purposes of the example illustrated in FIG. 3A, it is assumed that the first circuit 100 is currently the active circuit, and the second circuit 150 is currently the passive circuit. Initially, the first circuit is operable in a low gain state, where the switches 110, 115 are closed in order to connect the transition detection circuitry 105 to the input signals. Accordingly, the transition detection circuitry 105 is active at this time. However, the control circuitry disables both drive circuits 120, 125 at this stage.

Considering the second circuit 150 which is in the passive state, both the transition detection circuitry 155 and the drive circuitry 170, 175 are not active, and the switches 160, 165 are open to decouple the transition detection circuitry from the inputs.

Figure 3B:
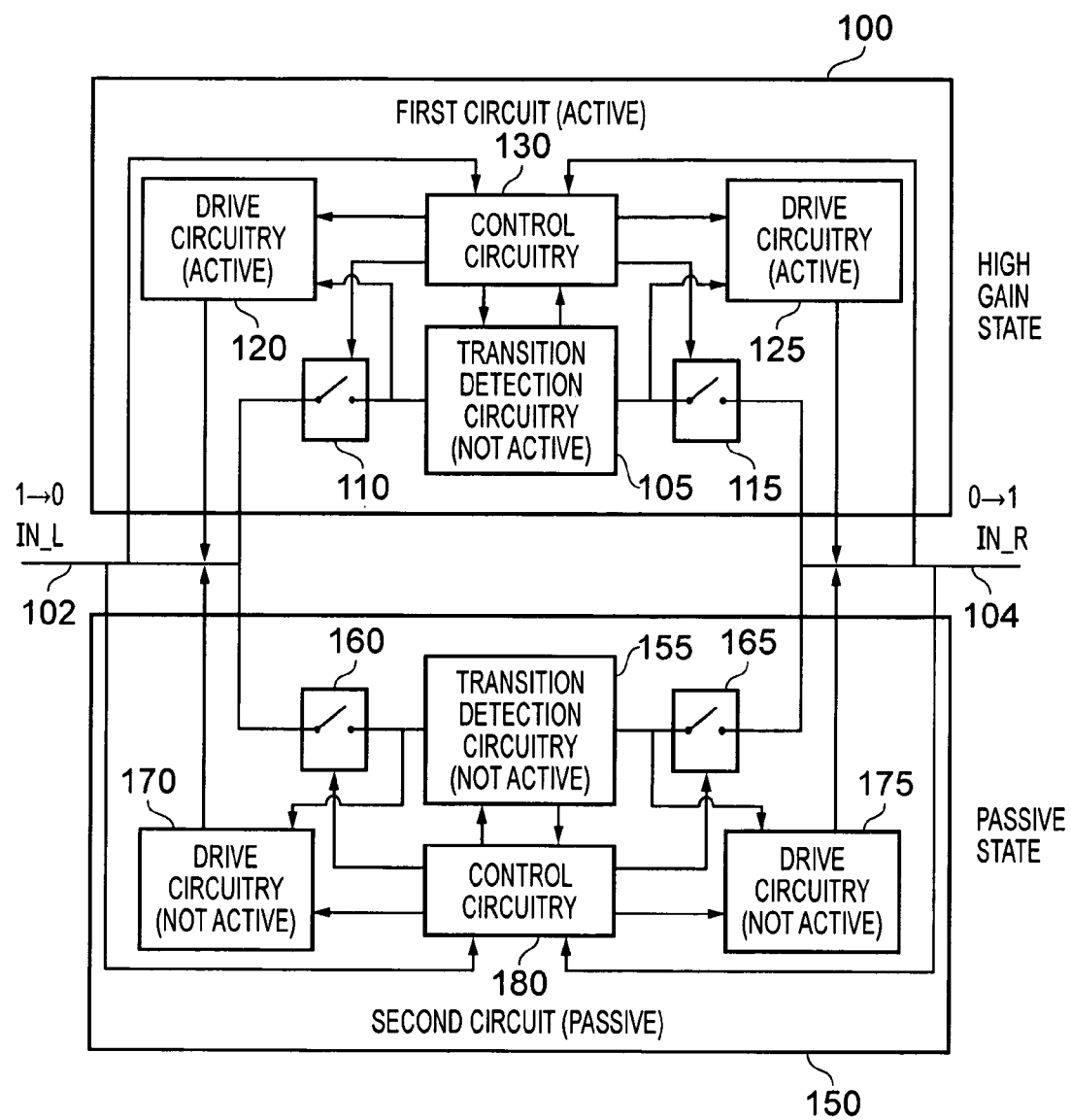

The first circuit 100 remains in the low gain state illustrated in FIG. 3A until the transition detection circuitry detects a transition on either input. Accordingly, it may detect a transition from a logic one value to a logic zero value on the input 102 or alternatively may detect a logic zero value to a logic one value transition on the input 104. As soon as such a transition is detected, the transition detection circuitry sends a signal to the control circuitry 130 which causes the control circuitry to open the switches 110, 115 thereby decoupling the transition detection circuitry from the inputs and placing it into the inactive state. At the same time, the drive circuits 120, 125 are enabled to drive the inputs to their new value. Accordingly, the input 120 will be driven to the logic zero value and the input 104 will be driven to the logic one value. In this state, the first circuit is said to be in the high gain state 100. Through use of the above described mechanism, the inputs can rapidly be transitioned to the new flipped state. During this time, as shown in FIG. 3B, the second circuit 150 remains in the passive state.

Figure 3C:
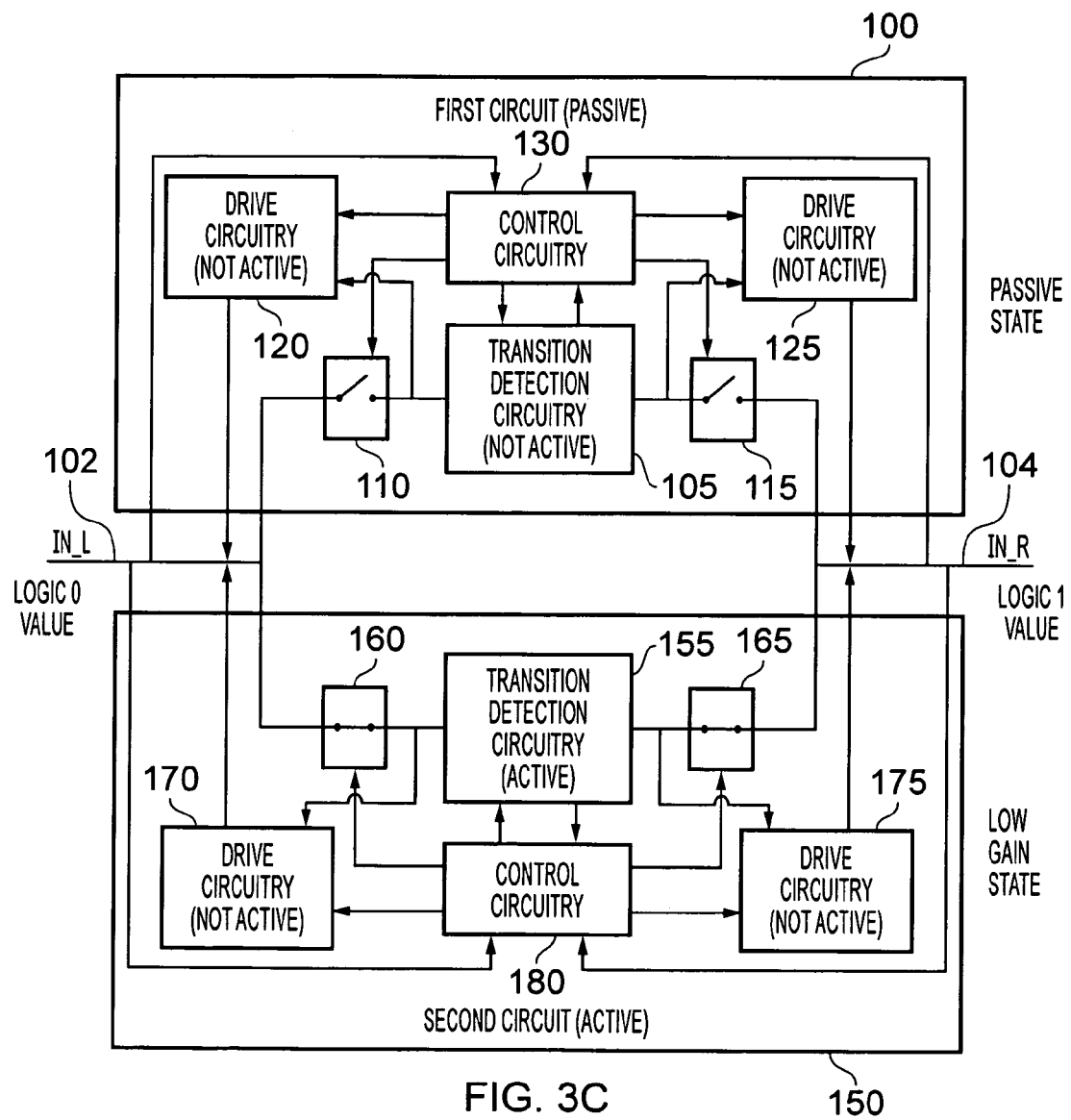

As shown in FIG. 3C, once the inputs 102, 104 have been driven to their new state, the control circuitry 130 will observe this new state via its connection to those inputs 102, 104, and at that time will place the drive circuits 120, 125 into an inactive state, whereby the first circuit 100 enters the passive state and becomes the passive circuit. At the same time, the corresponding control circuitry 180 in the second circuit 150 will also observe the state transition on the inputs 102, 104, and will cause the switches 160, 165 to be closed and the transition detection circuitry 155 to be activated, thereby causing the second circuit to enter the low gain state, and become the active circuit. At this point, the repeater is now self-configured to detect a subsequent transition occurring at either input 102, 104.

From the above description, it will be appreciated that the repeater of the above described embodiment is entirely self-configuring, and its operation is identical irrespective of whether a transition occurs due to a signal being transmitted from the first processor core 10 to the second processor core 12, or due to a signal being transmitted from the second processor core 12 to the first processor core 10. The repeater is also completely self-timed, and requires no clock signal for its operation. As a result, the repeater has no configuration overhead, thereby yielding both higher performance and less energy consumption when compared with a conventional repeater such as described earlier with reference to FIG. 1.

Figure 4:
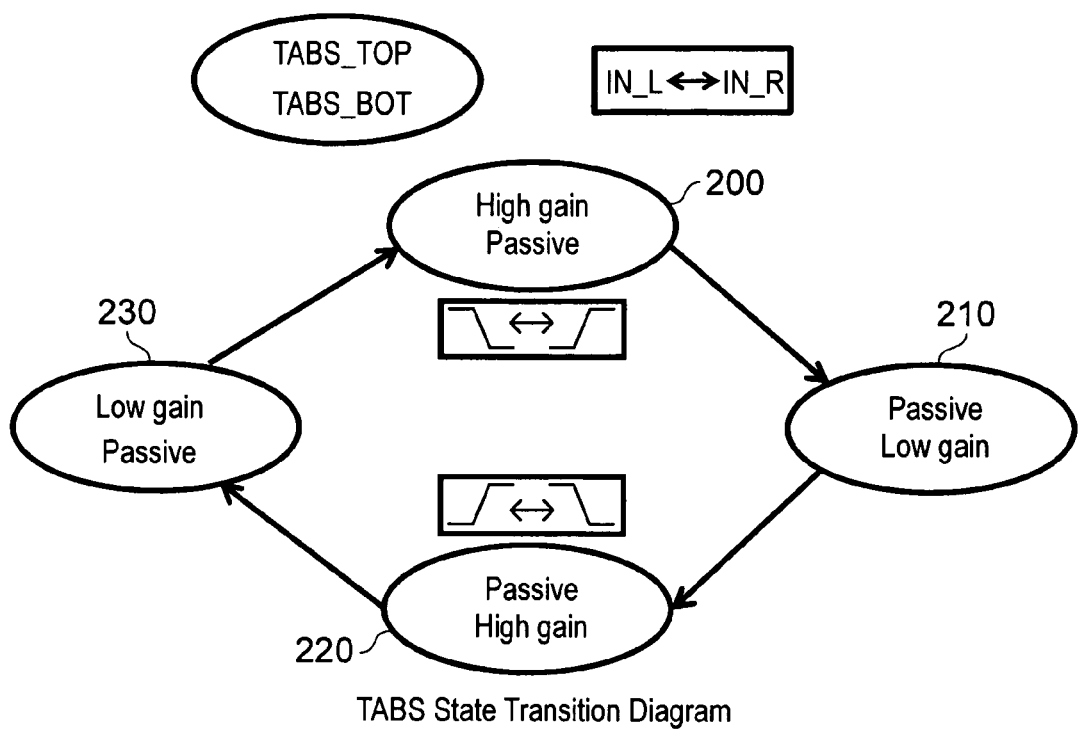
FIG. 4 is a state transition diagram for the repeaters used in accordance with one embodiment.

FIG. 4 is a state transition diagram for the repeater described above with reference to FIGS. 3A to 3C. In this diagram, the first circuit is referred to as TABS_TOP and the second circuit is referred to as TABS_BOT. As shown, the combination of processing states transitions between state 200, state 210, state 220 and state 230. The first circuit when active is able to detect a transition at the first input 102 from a logic one value to a logic zero value or a transition at the second input 104 from a logic zero value to a logic one value, whilst the second circuit when active is able to detect a transition from a logic zero value to a logic one value at the first input 102 or a logic one value to a logic zero value transition at the second input 104.

Figure 5:
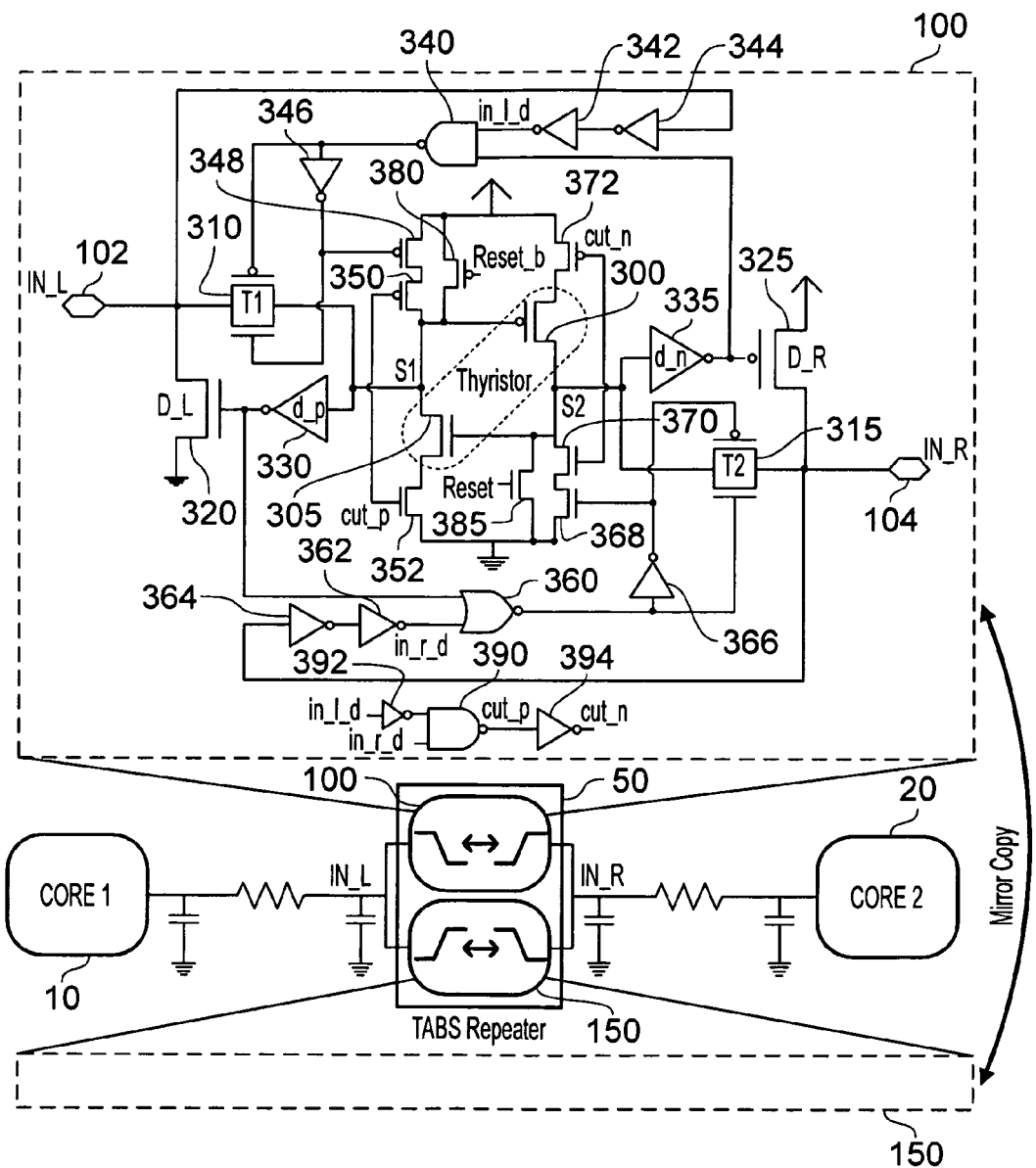
FIG. 5 is a detailed diagram illustrating the construction of each of the first and second circuits of each repeater in accordance with one embodiment.

FIG. 5 is a detailed diagram of one embodiment of the first circuit 100. As discussed earlier, the second circuit 150 is identically constructed, but with its ports connected to opposite nodes of the link so as to form a bidirectional repeater.

As shown in FIG. 5, a PMOS transistor 300 and NMOS transistor 305 are arranged in a CMOS thyristor configuration, and used as a transition amplifier. The circuit 100 senses a falling transition on input 102 or a rising transition on input 104, thereby causing the thyristor to switch and pull both interconnect nodes to opposite supply rails.

As discussed earlier, both the first circuit and the second circuit have three operating states, namely a low gain state, a high gain state and a passive state. In the absence of any switching, or when reset is asserted, the active circuit will be placed into the low gain state with the thyristor nodes precharged/pre-discharged to voltage levels where the sensing transistors have their lowest gain ($V_{gs}$=0). In this low gain state, as illustrated schematically in FIG. 6A (where the components used in the low gain state are labelled, and shown in bold), the sensing nodes S1 and S2 are connected to the inputs 102, 104 through the transmission gates T1 310 and T2 315 that are turned on during the low gain state. The S1 and S2 node voltages are held by keeper circuits placed on the inputs 102 and 104 (not shown).

When the input 102 transitions from a high value to a low value, node S1 will initially follow the transition. This will cause the PMOS device 300 in the thyristor to gradually turn on, raising the voltage at the node S2, thereby causing the NMOS thyristor device 305 to turn on. This regeneration mechanism causes the nodes S1 and S2 to switch rapidly.

The inverters 335, 330 are skewed with stronger NMOS (for the case of the inverter 335) and PMOS (for the case of the inverter 330) components to provide a faster response to the S1/S2 switching, thereby producing output signals which cause the components 340, 346, 360 and 366 within the control circuitry to turn off the transmission gates 310, 315, thereby decoupling the thyristor from the inputs. This decouples the nodes S1 and S2 from the inputs 102, 104, and allows for faster switching.

Figures 6A, 6B, 6C:
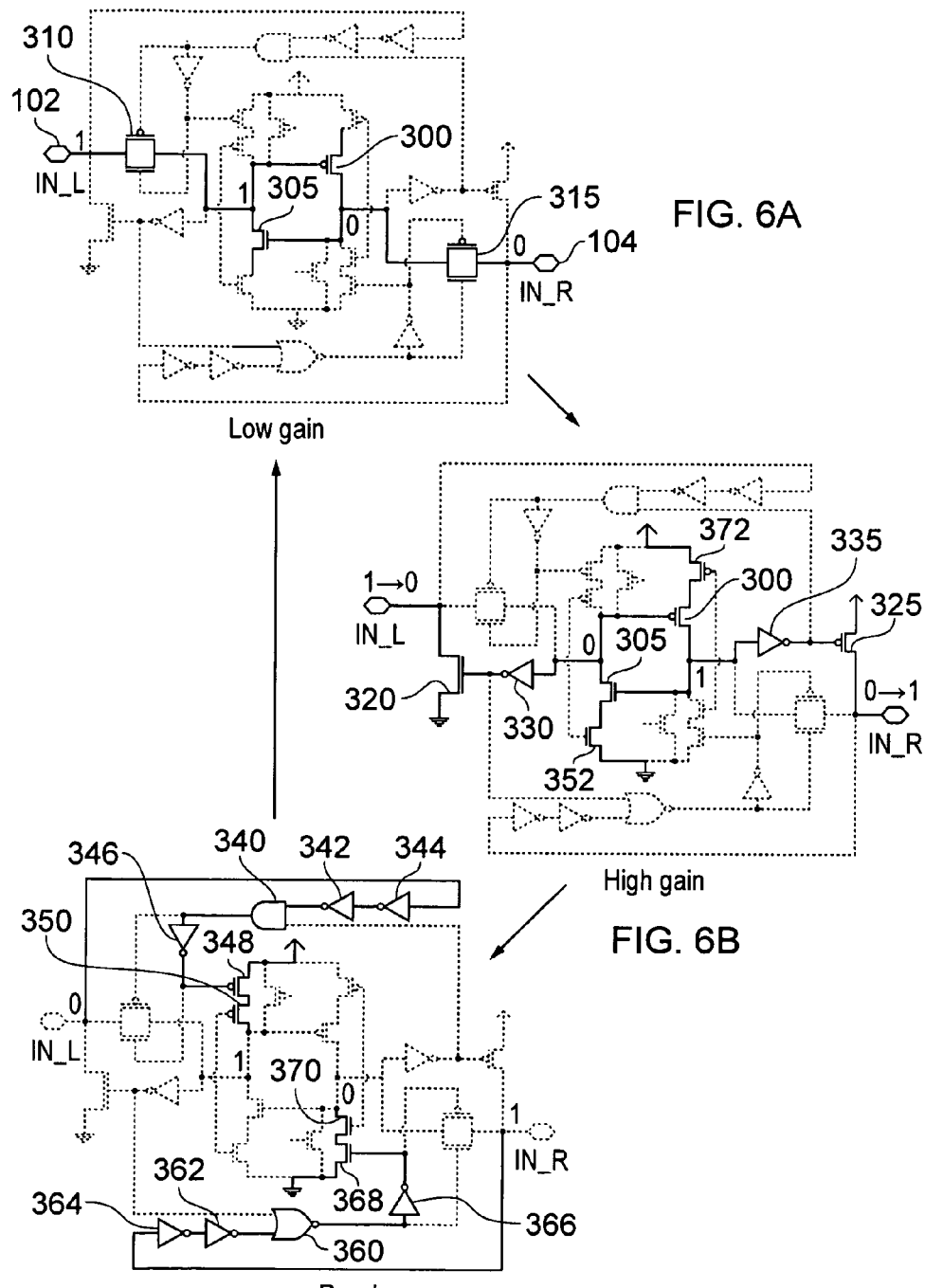
FIGS. 6A to 6C illustrate which components within the first or second circuit of FIG. 5 are used in each of the low gain, high gain and passive states, in accordance with one embodiment.

Once the transistors 300, 305 in the thyristor transition, the circuit 100 enters the high gain state shown in FIG. 6B (in FIG. 6B the components used in the high gain state being labelled, and shown in bold), where the sensing transistors have highest gain ($V_{gs}=V_{DD}/-V_{DD}$), this causing the large internal drivers 320, 325 to be strongly turned on via the inverters 330, 335, thereby rapidly pulling the inputs 102, 104 towards the respective supply rails to complete the transition of state.

Once the inputs 102 and 104 have both transitioned, their delayed signal values in_l_d and in_r_d enable the precharge signals cut_n and cut_p via the components 390, 392, 394, these precharge signals serving to reset and hold the thyristor in its precharge state.

As shown in FIG. 6C, the circuit then enters the passive state, where the elements 340, 342, 344, 346, 348 and 350 within the control circuit are active, as are the corresponding elements 360, 362, 364, 366, 368 and 370. In this state, both the drive circuits 320, 325 and the thyristor 300, 305 are inactive, and the thyristor is disconnected from the inputs.

As also shown in FIG. 5, when the reset signal is asserted, this turns on the transistor 385 to turn off the transistor 305, and similarly turns on the transistor 380 in order to turn off the transistor 300.

In one embodiment, to improve the speed of operation of the transistors 300, 305 forming the thyristor, those transistors are constructed to have a lower threshold voltage than other transistors within the circuit.

While one of the first circuit 100 or the second circuit 150 are in the low gain state, the other circuit 150, 100 is in the passive state. A transition on the interconnect causes the active circuit to switch from the low gain to the passive state via the high gain state, while the other passive circuit transitions from the passive state to the low gain state in order to become the active circuit and to thereafter begin sensing the interconnect to detect the next transition.

The arrangement of repeater circuit according to the above described embodiment provides a number of advantages. Firstly, it provides a drop-in replacement for conventional repeaters within a standard cell based design flow. In particular, the fully static implementation allows such TABS repeaters to be used as a standard cell in synthesis-based design flow. In addition, the repeater is self-timed and has no configuration overhead, allowing significant performance increases and energy consumption savings. For example, in one specific implementation, the use of the repeater arrangement of FIG. 5 enabled an 8 mm interconnect to achieve 37% higher performance at 20% less energy per bit compared to conventional repeaters such as those illustrated in FIG. 1, when implemented in 65 nm CMOS at 1.0 volts.

Furthermore, the absence of configuration logic obviates the need for clocking, simplifying the design flow and providing significantly improved energy efficiency for low data switching activity, where clocking accounts for a significant proportion of the energy consumption within a conventional design. In particular, in one embodiment it was found that the design of FIG. 5 provided up to fourteen times better energy efficiency for low data switching activity.

In addition, the design of FIG. 5 provides a robust operation across a wide range of supply voltages, thereby allowing its use in a wide variety of implementations. In addition to improving performance, these features increase the optimal repeater insertion interval, yielding a significant reduction in the number of repeaters required along a bidirectional communication path when compared with conventional repeaters. In one particular example, it was found that the insertion interval could be increased from 625 μm to 1 mm yielding 38% fewer repeaters within the bidirectional communication path. Further, at 1.5 mm spacing, the energy efficiency was found to be improved by 51% and the repeater count was reduced by 58% while maintaining iso-performance with conventional optimally spaced repeaters.

In addition to being used as a repeater, a similar circuit arrangement can also be used to provide a synchronous version of the repeater for use at synchronising boundaries in place of conventional bidirectional flip flops, giving rise to significant area savings when compared with such conventional bidirectional flip flops.

Figure 7A:
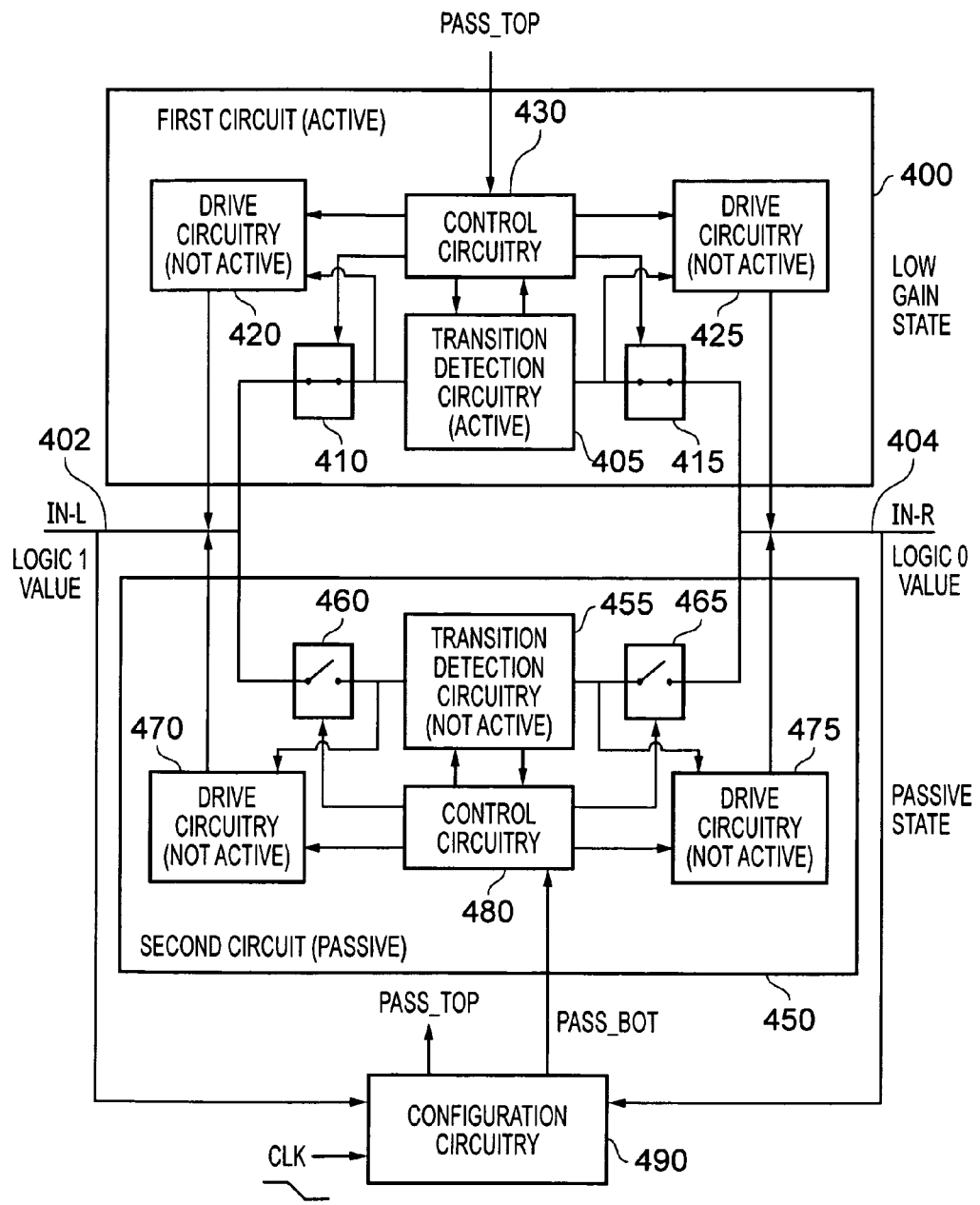
FIGS. 7A to 7C are block diagrams illustrating components provided within first and second circuits of the flip-flops of FIG. 2 in accordance with one embodiment, and illustrating how the states of those circuits change during operation of the apparatus.

The arrangement of the circuitry when operating as such a flip flop is illustrated schematically in FIG. 7A. As will be seen from a comparison with FIG. 3A, the basic circuit arrangement is very similar, and hence the components 405, 410, 415, 420, 425 and 430 within the first circuit 400 correspond generally with the components 105, 110, 115, 120, 125, 130 in the first circuit 100 of FIG. 3A. Similarly, the components 455, 460, 465, 470, 475 and 480 of the second circuit 450 correspond generally with the components 155, 160, 165, 170, 175 and 180 of the second circuit 150 of FIG. 3A.

However, in this embodiment, rather than the control circuits 430, 480 monitoring the inputs 402, 404 directly, those inputs are instead provided to configuration circuitry 490 which is controlled in dependence on the clock signal. In particular, the value of those inputs on the falling edge of the clock signal is latched within the configuration circuitry and used to generate two control signals referred to in FIG. 7A as PASS_TOP and PASS_BOT. The PASS_TOP signal is provided to the control circuitry 430 within the first circuit 400, whilst the PASS_BOT signal is provided to the control circuitry 480 within the second circuit 450. A more detailed discussion of how those signals are generated will be provided later with reference to FIG. 8.

Figure 7B:
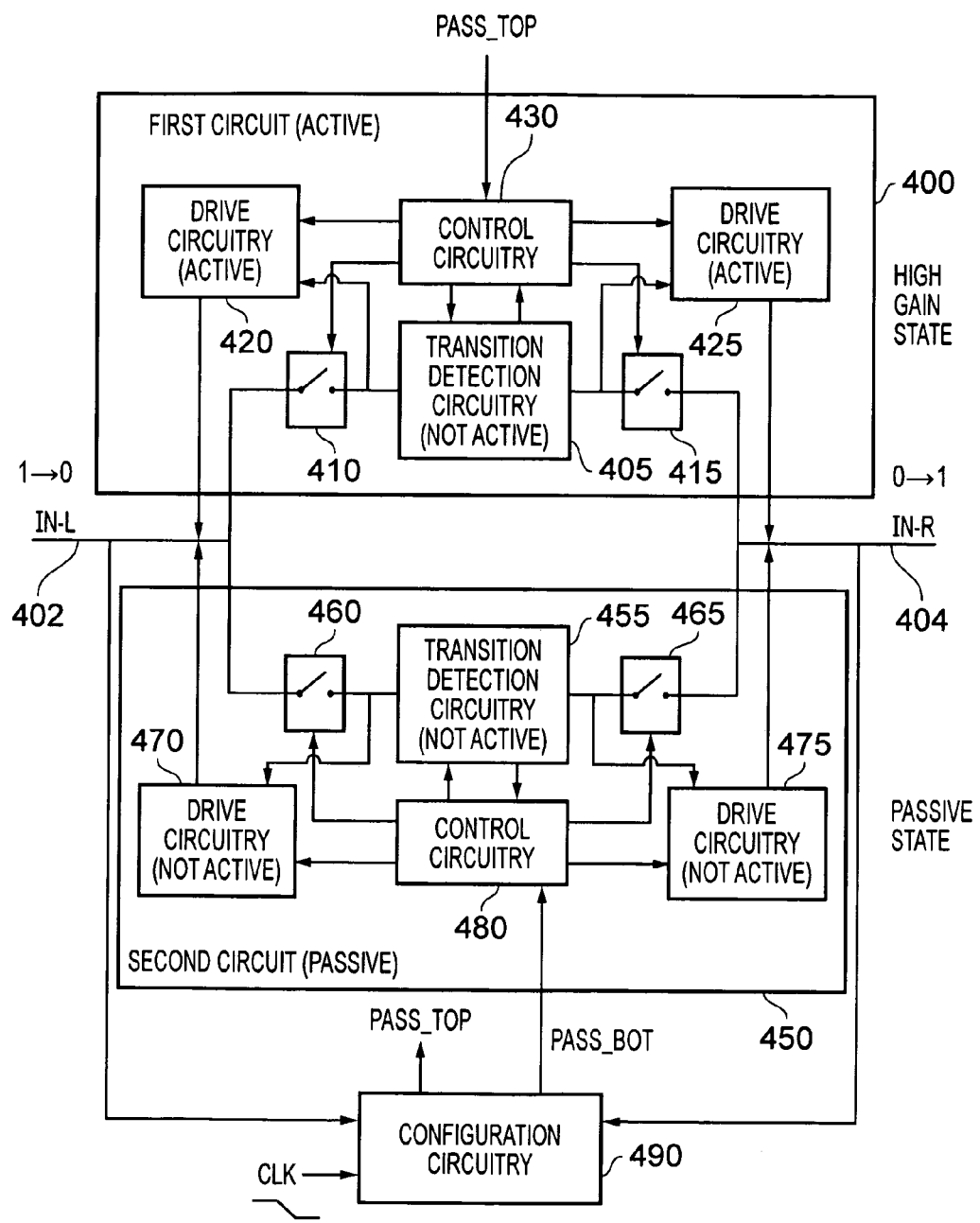
Figure 7C:
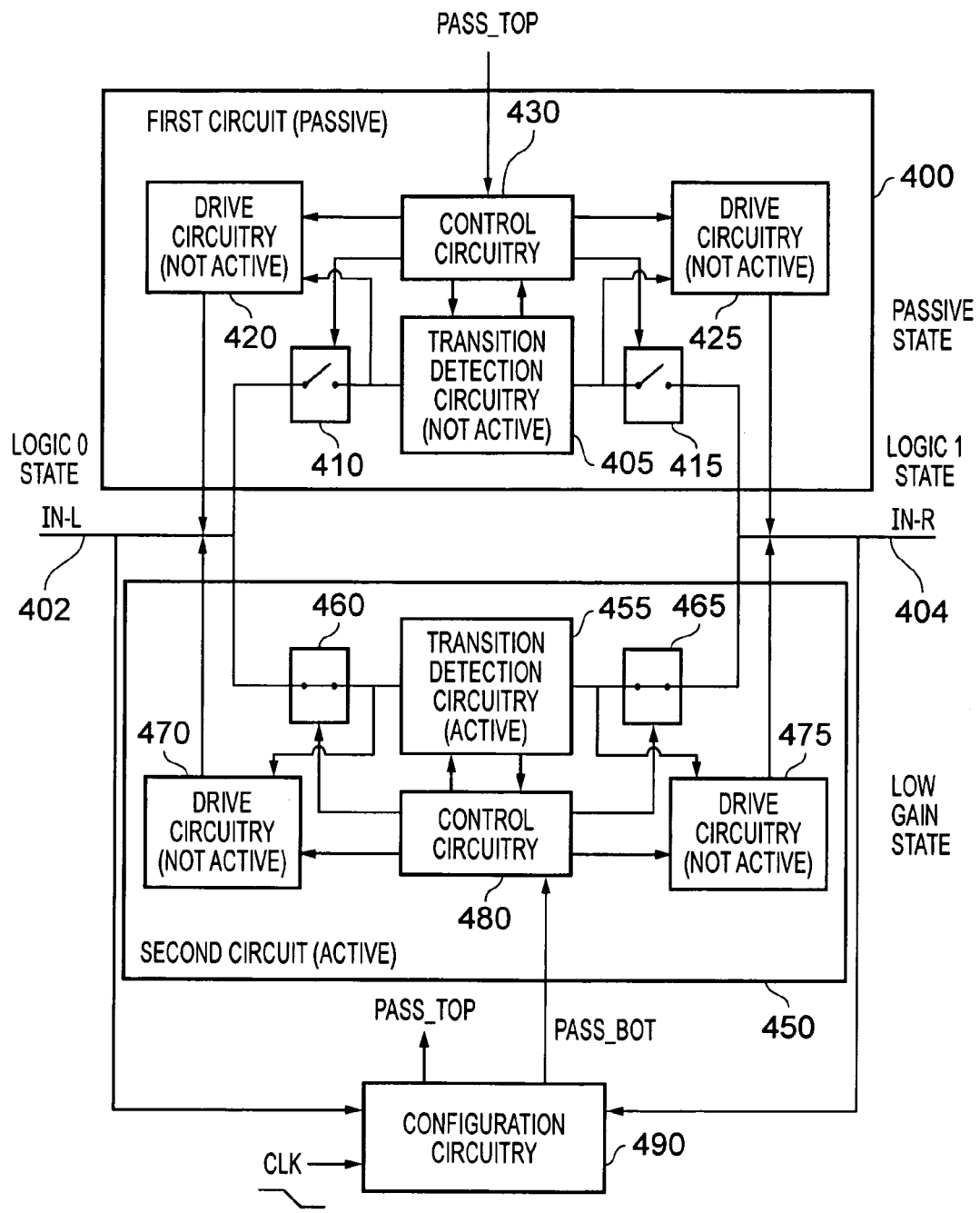

As will be apparent from a comparison of FIGS. 7A to 7C with the earlier described FIGS. 3A to 3C, the basic operation is the same, with one circuit being the active circuit and the other circuit being the passive circuit at any point in time, and with the active circuit transitioning from the low gain state to the high gain state and thereafter to the passive state to then become the passive circuit, whilst the passive circuit stays in the passive state until the transition has fully taken place, whereafter it becomes the active circuit to monitor the bidirectional communication path for the next transition.

Figure 8:
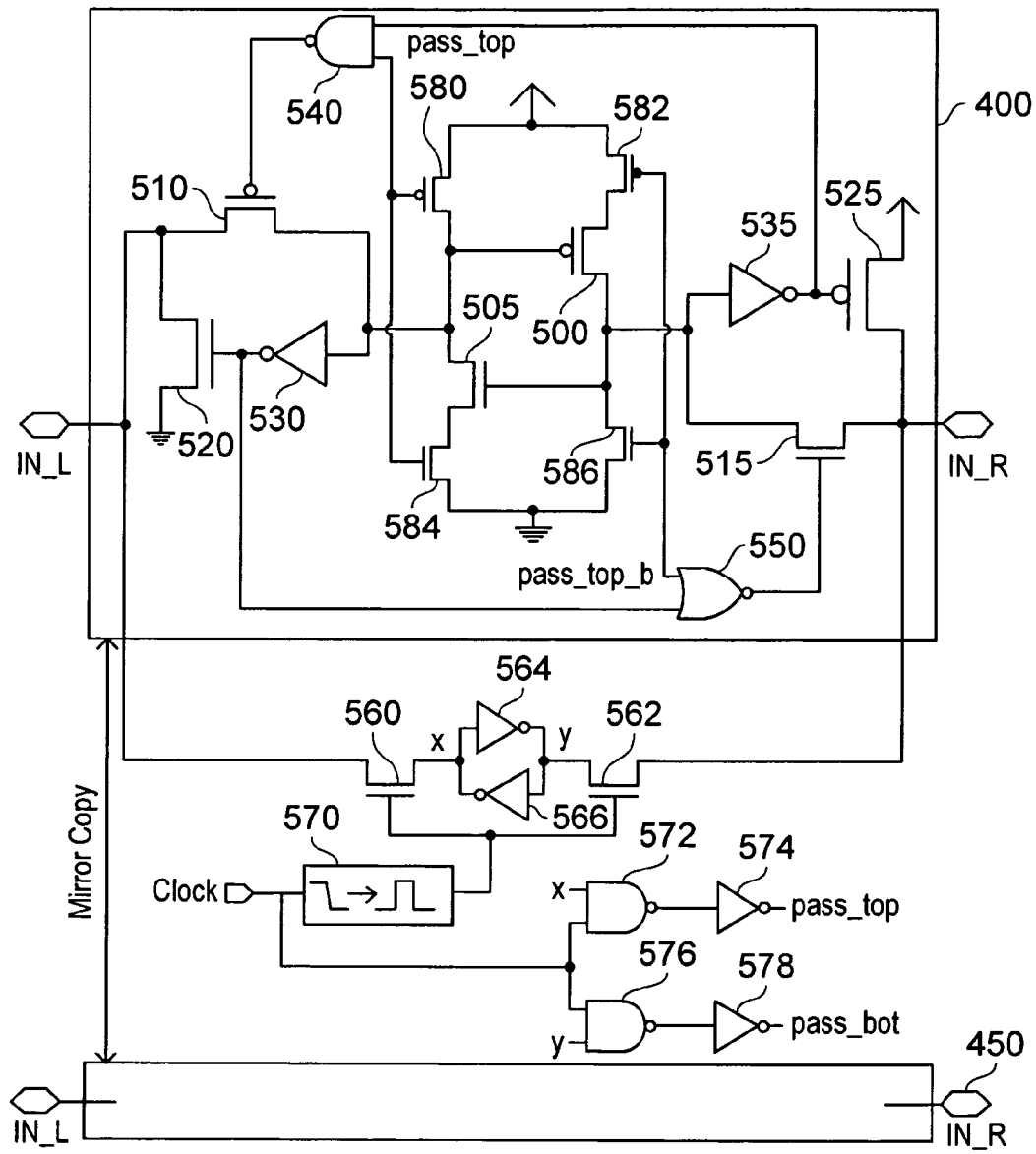
FIG. 8 is a detailed diagram illustrating the construction of each of the first and second circuits within each flip-flop of FIG. 2 in accordance with one embodiment.

FIG. 8 is a diagram illustrating in more detail the components provided within the first circuit 400 of FIG. 7A, and the components provided within the configuration circuitry 490. The two transistors 500, 505 form the thyristor used to implement the transition detection circuitry 405. The switches 410 and 415 are provided by the transistors 510, 515 and the drive circuits 420, 425 are formed by the drive transistors 520, 525. The control circuitry is formed by the NAND gate 540, NOR gate 550 and the various transistors 580, 582, 584, 586. The basis operation is as described earlier for the circuit of FIG. 5. However, instead of the value on the inputs being used to directly transition the circuit from the high gain state in to the passive state, or from the passive state into the low gain state, the PASS_TOP and PASS_BOT signals generated by the configuration circuitry 490 are used. In particular, as shown in FIG. 8, a 6T SRAM cell is formed by the components 560, 562, 564, 566, and the direction of the transition is stored into that 6T SRAM cell based on the state of the interconnect at the falling edge of the clock signal. In particular, the pulse generator 570 generates a pulse signal in response to the falling edge of the clock, which causes the 6T SRAM cell to sample the value on the inputs.

As is apparent from the components 572, 574, 576, 578, dependent on the value stored within the 6T SRAM cell, either the PASS_TOP signal or the PASS_BOT signal will be set, whilst the other signal is not set. If the PASS_TOP signal is set, then the circuit 400 will be the active circuit, whereas if the PASS_BOT signal is set, then the circuit 450 will be the active circuit. Hence, at the start of each clock cycle, one of the circuits will be the active circuit, whilst the other will be the passive circuit dependent on the values of the PASS_TOP and PASS_BOT signals.

From the above description of FIG. 8, it will be seen that such an arrangement provides a synchronous version of the repeater structure for use at synchronising boundaries in place of convention bidirectional flip flops, and in one implementation has been found to provide a 36% area saving when compared with the use of conventional bidirectional flip flops.

Figure 9:
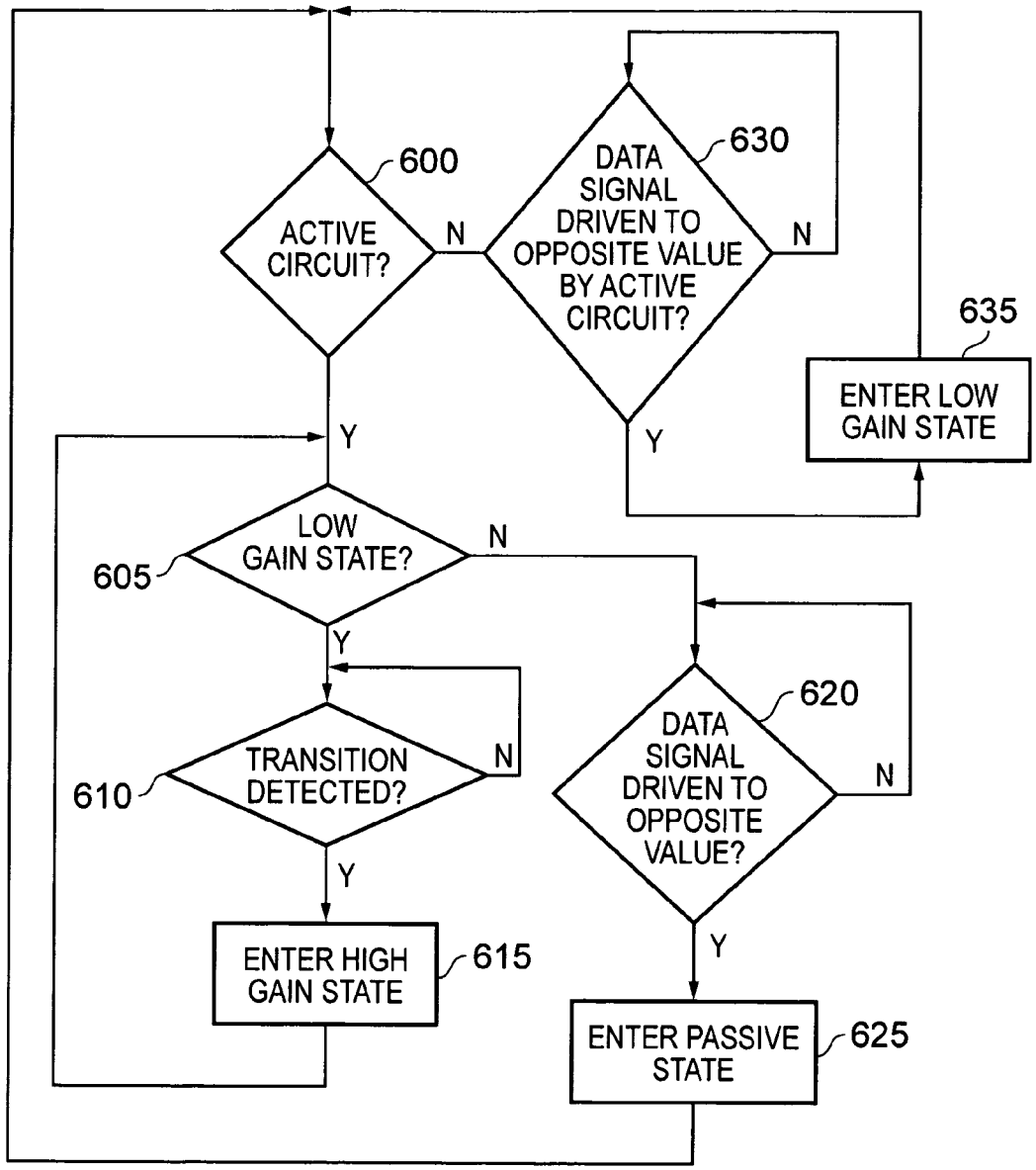
FIG. 9 is a flow diagram illustrating the operation of each of the first and second circuits in accordance with one embodiment.

FIG. 9 is a flow diagram schematically illustrating the operation of each of the first circuit and second circuit of either the repeater of FIG. 5 or the flip flop structure of FIG. 8. At step 600, the circuit determines whether it is the active circuit and, if so, at step 605 determines whether it is in the low gain state. If it is in the low gain state, then it is determined at step 610 whether a transition has been detected by the thyristor. If not, the process remains at step 610 until a transition is detected, whereafter the process proceeds to step 615, where the high gain state is entered. Thereafter, the process returns to step 605.

At step 605 it is then determined that the current state is not the low gain state, and accordingly the process branches to step 620, where it is determined whether the data signal has been driven to the opposite value (i.e. where the transition has fully taken place). As discussed earlier, the drive transistors will at this point be strongly driving the input nodes to the required opposite values. The process stays at step 620 until the data signal has been driven to the opposite value, whereafter the process proceeds to step 625, where the circuit enters the passive state, and hence becomes the passive circuit. Thereafter, the process returns to step 600.

This time, at step 600, it will be determined that the circuit is not the active circuit, and accordingly the process branches to step 630, where it is determined whether the data signal has been driven to the opposite value by the active circuit. The process remains at step 630 until this is the case, whereafter the process transitions to step 635, where the circuit enters the low gain state, and hence becomes the active circuit. Thereafter, the process returns to step 600.

The TABS structures discussed earlier offer three key advantages over conventional inverter-based repeaters. Firstly, the regeneration followed by decoupling mechanism makes switching latency less dependent on slow slew rates on long interconnects as commonly seen in global wires. In a conventional repeater a transition is performed only by the driver, as opposed to the TABS approach where the receiver aids the driver after detection. In addition, the internal feedback and state tracking mechanism eliminates the need for a global synchronising signal.

Figure 10A:
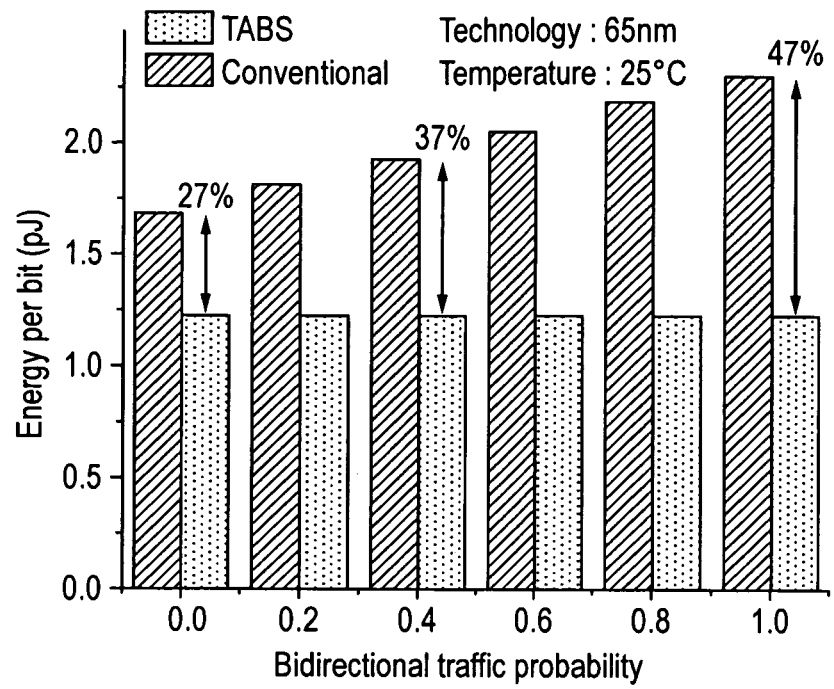
FIGS. 10A and 10B are graphs illustrating the energy consumption benefits that arise when using repeaters in accordance with one embodiment.

FIG. 10A is a graph illustrating the energy consumption savings achievable when using the TABS structures of the described embodiments, when compared with conventional repeaters, for the example of 65 nm technology operating at 25° C. As illustrated, due to the absence of any configuration overhead, the TABS technique improves energy efficiency by between 27 and 47% with increasing bidirectional traffic at iso-throughput of 602 Mb/s per link. The bidirectional traffic probability indicates the probability of the direction of traffic changing. As expected, the more often the direction changes, the greater the energy saving that arises when using the TABS technique, due to there being no requirement for any configuration to be performed when using the TABS approach (as contrasted with the conventional approach described earlier with reference to FIG. 1, where the various flip flops 30 will need to be reconfigured every time the direction changes).

Figure 10B:
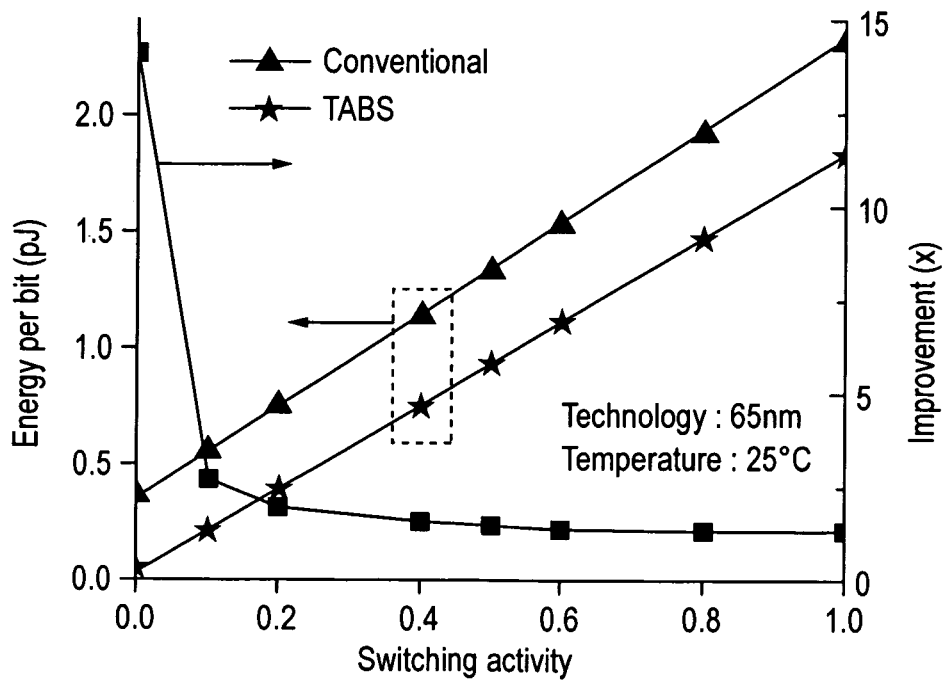

FIG. 10B is a graph illustrating the energy savings that arise due to the avoidance for the need for clocking when using the TABS structures of the described embodiments. The switching activity is a measure of the likelihood that the data will transition state. Hence, in this example it is being assumed that the direction is not changing, with a switching activity of zero indicating that the data is static and a switching activity of one indicating that the data is switching each clock cycle. As can be seen, when the data is static, the TABS technique uses no energy, whilst the conventional approach still consumes energy due to the various flip flops 30 being clocked. Hence, when the data is static, this gives rise to the largest relative energy saving. Conversely as the amount of switching increases, the percentage energy saving decreases since the energy consumed due to clocking becomes a less significant proportion of the overall energy consumed.

The improved performance that results from using the above described TABS approach can be exploited for further energy efficiency gains by increasing the insertion interval. Due to the increased insertion intervals that can be realised when using the TABS structures of the above described embodiments, this makes such TAB structures highly suitable for use in bidirectional communication links that run over caches and other IP blocks that prohibit frequent repeater insertion.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An apparatus for transferring a data signal propagated along a bidirectional communication path within a data processing apparatus, comprising:
   a first circuit and a second circuit connected in parallel to the bidirectional communication path, at any point in time one of the first and second circuits being an active circuit monitoring a value of the data signal on the bidirectional communication path and the other of the first and second circuits being a passive circuit that is not monitoring the value of the data signal;
   each of the first circuit and the second circuit comprising:
      transition detection circuitry configured, when connected to the bidirectional communication path, to detect a transition in an initial value of the data signal on the bidirectional communication path;
      switch circuitry configured to selectively connect the transition detection circuitry to the bidirectional communication path;
      drive circuitry configured when active to be responsive to detection of the transition by the transition detection circuitry to drive the data signal on the bidirectional communication path to an opposite value to the initial value; and
      control circuitry configured to control the operation of the transition detection circuitry, switch circuitry and drive circuitry;
   the active circuit initially being in a low gain state where the switch circuitry connects the transition detection circuitry to the bidirectional communication path, and the drive circuitry is not active;
   the control circuitry of the active circuit being responsive to a signal from the transition detection circuitry indicating that said transition has been detected, to cause the active circuit to enter a high gain state where the switch circuitry disconnects the transition detection circuitry from the bidirectional communication path, and the drive circuitry is activated in order to drive the data signal on the bidirectional communication path to said opposite value;
   the control circuitry of the one of the first and second circuits which is currently the active circuit being configured, following the data signal being driven to said opposite value, to place that one of the first and second circuits in a passive state where it then becomes the passive circuit; and
   the control circuitry of the other one of the first and second circuits which is currently the passive circuit being configured, following the data signal being driven to said opposite value, to place that other one of the first and second circuits in said low gain state where it then becomes the active circuit.

2. An apparatus as claimed in claim 1, wherein the apparatus forms a repeater placed within the bidirectional communication path to amplify the data signal as that signal is propagated along the bidirectional communication path.

3. An apparatus as claimed in claim 2, wherein the control circuitry in each of the first and second circuits receives as control input signals said signal from the transition detection circuitry indicating that said transition has been detected, and a signal indicative of the value of the data signal on the bidirectional communication path at an input to the first and second circuits, and is configured to control the transition of the associated first and second circuit between said passive state, said low gain state and said high gain state in dependence on those control input signals.

4. An apparatus as claimed in claim 3, wherein:
   if the value of the data signal at said input is a first value, the control circuitry of the first circuit is configured to place that first circuit in said low gain state where the first circuit is the active circuit, and the control circuitry of the second circuit is configured to place that second circuit in said passive state where the second circuit is the passive circuit; and
   if the value of the data signal at said input is a second value, the control circuitry of the second circuit is configured to place that second circuit in said low gain state where the second circuit is the active circuit, and the control circuitry of the first circuit is configured to place that first circuit in said passive state where the first circuit is the passive circuit.

5. An apparatus as claimed in claim 4, wherein:
   when the transition detection circuitry of the active circuit detects said transition, the control circuitry of the active circuit is configured to cause that active circuit to change from the low gain state to the high gain state; and
   the control circuitry of the passive circuit is configured to retain the passive circuit in the passive state until after the data signal has been driven to said opposite value by the operation of the active circuit in said high gain state.

6. An apparatus as claimed in claim 2, wherein said repeater acts as an inverter.

7. An apparatus as claimed in claim 2, wherein said repeater acts as a buffer.

8. An apparatus as claimed in claim 1, wherein the apparatus forms a state retention element placed within the bidirectional communication path to latch the data signal propagated along the bidirectional communication path in dependence on a clock signal.

9. An apparatus as claimed in claim 8, further comprising:
   a configuration storage element configured to store a control value indicative of the value of the data signal on the bidirectional communication path at an input to the first and second circuits during a predetermined transition in the clock signal;
   wherein the control circuitry in each of the first and second circuits receives as control input signals said signal from the transition detection circuitry indicating that said transition has been detected, and said control value stored in said configuration storage element, and is configured to control the transition of the associated first and second circuit between said passive state, said low gain state and said high gain state in dependence on those control input signals.

10. An apparatus as claimed in claim 9, wherein:
    if said control value stored in said configuration storage element is a first value, the control circuitry of the first circuit is configured to place that first circuit in said low gain state where the first circuit is the active circuit, and the control circuitry of the second circuit is configured to place that second circuit in said passive state where the second circuit is the passive circuit; and
    if said control value stored in said configuration storage element is a second value, the control circuitry of the second circuit is configured to place that second circuit in said low gain state where the second circuit is the active circuit, and the control circuitry of the first circuit is configured to place that first circuit in said passive state where the first circuit is the passive circuit.

11. An apparatus as claimed in claim 10, wherein:
    when the transition detection circuitry of the active circuit detects said transition, the control circuitry of the active circuit is configured to cause that active circuit to change from the low gain state to the high gain state; and the control circuitry of the passive circuit is configured to retain the passive circuit in the passive state until after the control value stored in said configuration storage element has been updated following the next predetermined transition in said clock signal.

12. An apparatus as claimed in claim 9, further comprising a pulse generator configured to generate an activation pulse on occurrence of said predetermined transition in said clock signal, the activation pulse causing the configuration storage element to update the stored control value to indicate the current value of the data signal on the bidirectional communication path at said input to the first and second circuits.

13. An apparatus as claimed in claim 9, wherein said predetermined transition in said clock signal is a falling edge of the clock signal.

14. An apparatus as claimed in claim 1, wherein the transition detection circuitry comprises a pair of transistors arranged in a thyristor configuration.

15. An apparatus as claimed in claim 14, wherein both transistors of said pair are constructed to have a lower threshold voltage than other transistors within said apparatus.

16. An apparatus as claimed in claim 1, wherein the transition detection circuitry comprises:
a pair of sensing nodes connected via the switch circuitry to said bidirectional communication path; and
skewed inverter circuitry connected to said pair of sensing nodes and configured to generate the signal indicating that said transition has been detected.

17. An apparatus as claimed in claim 1, wherein the apparatus has first and second input connections to said bidirectional communication path, the apparatus further comprising:
reset circuitry responsive to a reset condition to reset the value of the data signal at said first and second input connections to a predetermined state.

18. An apparatus as claimed in claim 17, wherein the apparatus forms an inverter, and the reset circuitry is responsive to the reset condition to reset the value of the data signal to a logic 1 value at one of said first and second input connections and to a logic 0 value at the other one of said first and second input connections.

19. An interconnect structure for a data processing apparatus comprising:
a bidirectional communication path configured to route a data signal between first and second processing blocks of the data processing apparatus; and
a plurality of repeater circuits distributed along said bidirectional communication path in order to separate said bidirectional communication path into a series of bidirectional communication path portions, each repeater circuit comprising an apparatus as claimed in claim 1.

20. An interconnect structure as claimed in claim 19, further comprising:
reset circuitry responsive to a reset condition to reset the value of the data signal on each bidirectional communication path portion to a predetermined state.

21. An interconnect structure as claimed in claim 20, wherein each repeater forms an inverter, and the reset circuitry is responsive to the reset condition to reset the value of the data signal to a logic 1 value on every alternate bidirectional communication path portion, and to a logic 0 value on every other bidirectional communication path portion.

22. A method of operating an apparatus to transfer a data signal propagated along a bidirectional communication path within a data processing apparatus, the apparatus comprising a first circuit and a second circuit connected in parallel to the bidirectional communication path, at any point in time one of the first and second circuits being an active circuit monitoring a value of the data signal on the bidirectional communication path and the other of the first and second circuits being a passive circuit that is not monitoring the value of the data signal, each of the first circuit and the second circuit comprising: transition detection circuitry for detecting, when connected to the bidirectional communication path, a transition in an initial value of the data signal on the bidirectional communication path; switch circuitry for selectively connecting the transition detection circuitry to the bidirectional communication path; drive circuitry which when active is responsive to detection of the transition by the transition detection circuitry to drive the data signal on the bidirectional communication path to an opposite value to the initial value; and control circuitry for controlling the operation of the transition detection circuitry, switch circuitry and drive circuitry, the method comprising:
initially placing the active circuit in a low gain state where the switch circuitry connects the transition detection circuitry to the bidirectional communication path, and the drive circuitry is not active;
causing the control circuitry of the active circuit, in response to a signal from the transition detection circuitry indicating that said transition has been detected, to place the active circuit in a high gain state where the switch circuitry disconnects the transition detection circuitry from the bidirectional communication path, and the drive circuitry is activated in order to drive the data signal on the bidirectional communication path to said opposite value;
following the data signal being driven to said opposite value, causing the control circuitry of the one of the first and second circuits which is currently the active circuit to place that one of the first and second circuits in a passive state where it then becomes the passive circuit; and
following the data signal being driven to said opposite value, causing the control circuitry of the other one of the first and second circuits which is currently the passive circuit to place that other one of the first and second circuits in said low gain state where it then becomes the active circuit.

23. An apparatus for transferring a data signal propagated along a bidirectional communication path within a data processing apparatus, comprising:
first means and second means for connecting in parallel to the bidirectional communication path, at any point in time one of the first and second means being an active means for monitoring a value of the data signal on the bidirectional communication path and the other of the first and second means being a passive means for not monitoring the value of the data signal;
each of the first means and the second means comprising:
transition detection means for detecting, when connected to the bidirectional communication path, a transition in an initial value of the data signal on the bidirectional communication path;
switch means for selectively connecting the transition detection means to the bidirectional communication path;
drive means for driving, when active and in response to detection of the transition by the transition detection means, the data signal on the bidirectional communication path to an opposite value to the initial value; and
control means for controlling the operation of the transition detection means, switch means and drive means;

the active means initially being in a low gain state where the switch means connects the transition detection means to the bidirectional communication path, and the drive means is not active;

the control means of the active means, responsive to a signal from the transition detection means indicating that said transition has been detected, for causing the active means to enter a high gain state where the switch means disconnects the transition detection means from the bidirectional communication path, and the drive means is activated in order to drive the data signal on the bidirectional communication path to said opposite value;

the control means of the one of the first and second means which is currently the active means, following the data signal being driven to said opposite value, for placing that one of the first and second means in a passive state where it then becomes the passive means; and the control means of the other one of the first and second means which is currently the passive means, following the data signal being driven to said opposite value, for placing that other one of the first and second means in said low gain state where it then becomes the active means.

* * * * *